(12) United States Patent
Volmer et al.

(10) Patent No.: US 9,950,197 B2
(45) Date of Patent: Apr. 24, 2018

(54) BLOWER FILTER DEVICE

(71) Applicant: Dräger Safety AG & Co. KGaA, Lübeck (DE)

(72) Inventors: Achim Volmer, Lübeck (DE); Olaf Balke, Reinfeld (DE); Björn Ehler, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 1016 days.

(21) Appl. No.: 14/255,335

(22) Filed: Apr. 17, 2014

(65) Prior Publication Data

US 2014/0311490 A1 Oct. 23, 2014

(30) Foreign Application Priority Data

Apr. 20, 2013 (DE) ........................ 10 2013 006 915

(51) Int. Cl.
*A62B 7/10* (2006.01)
*F04D 27/00* (2006.01)
*A62B 18/02* (2006.01)
*A62B 23/02* (2006.01)

(52) U.S. Cl.
CPC ................ *A62B 7/10* (2013.01); *A62B 18/02* (2013.01); *A62B 23/02* (2013.01); *F04D 27/004* (2013.01)

(58) Field of Classification Search
CPC ........... A62B 7/10; A62B 18/02; A62B 23/02; F04D 27/004
USPC ................................................... 128/204.21
See application file for complete search history.

(56) References Cited

U.S. PATENT DOCUMENTS

| 4,807,616 A * | 2/1989 | Adahan ................. A61M 16/00 128/204.21 |
| 5,035,239 A | 7/1991 | Edwards |
| 6,397,841 B1 * | 6/2002 | Kenyon ............... A61M 16/08 128/202.27 |
| 2003/0024529 A1 * | 2/2003 | Beizndtsson ........ A62B 17/005 128/201.29 |
| 2007/0101867 A1 * | 5/2007 | Hunter .................... A61L 9/205 96/224 |

(Continued)

FOREIGN PATENT DOCUMENTS

DE 68 90 9693 T2 2/1994
DE 689 09 707 T2 2/1994

(Continued)

*Primary Examiner* — Tan-Uyen (Jackie) T Ho
*Assistant Examiner* — Jonathan Paciorek
(74) *Attorney, Agent, or Firm* — McGlew and Tuttle, P.C.

(57) ABSTRACT

A blower filter device (50) for a respirator system (1) has a filter unit (31) receiving an air filter (30) and a blower unit (65) drawing in the filtered air and generating discharged air. The blower unit has a blower (53) and a driving motor (54). An improved respirator system is provided with the blower filter device having a pressure sensor (55) arranged in the discharged air measuring the pressure of the discharged air, a mass flow sensor (56) arranged in the discharged air measuring the mass flow of the discharged air, or a parameter-determining unit (59, 60) determining an operating parameter of the motor. A control unit (51, 52) determines the volume flow of the discharged air via the measured pressure, the measured mass flow or based on the operating parameter determined and sets the motor as a function of the volume flow determined.

20 Claims, 5 Drawing Sheets

(56) References Cited

U.S. PATENT DOCUMENTS

| | | | | |
|---|---|---|---|---|
| 2009/0266361 A1* | 10/2009 | Bilger | ................... | A62B 7/10 |
| | | | | 128/204.21 |
| 2010/0083967 A1 | 4/2010 | Kuriyama | | |
| 2010/0298993 A1* | 11/2010 | Eaton | ................ | H01R 13/6456 |
| | | | | 700/282 |
| 2012/0017906 A1* | 1/2012 | Hansmann | ............... | A62B 7/10 |
| | | | | 128/204.21 |
| 2012/0055815 A1* | 3/2012 | Truex | ................... | A62B 9/006 |
| | | | | 206/205 |

FOREIGN PATENT DOCUMENTS

| | | |
|---|---|---|
| DE | 102 50 414 A1 | 12/2003 |
| DE | 100 21 581 B4 | 1/2005 |
| DE | 10 2004 013453 B4 | 7/2006 |
| DE | 10 2010 031754 B4 | 8/2012 |
| EP | 0 413 555 A1 | 2/1991 |
| EP | 0 518 538 A2 | 12/1992 |
| FR | 2 709 066 A1 | 2/1995 |
| WO | 01/80952 A1 | 11/2001 |
| WO | 2011/019778 A1 | 2/2011 |
| WO | 2013/082644 A1 | 6/2013 |

\* cited by examiner

US 9,950,197 B2

BLOWER FILTER DEVICE

CROSS REFERENCE TO RELATED APPLICATIONS

This application claims the benefit of priority under 35 U.S.C. § 119 of German Patent Application DE 10 2013 006 915.7 filed Apr. 20, 2013, the entire contents of which are incorporated herein by reference.

FIELD OF THE INVENTION

The present invention pertains to a blower filter device for a respirator system, to a respirator system with such a blower filter device and to a method for operating a blower filter device.

BACKGROUND OF THE INVENTION

Respirator systems protect the user from particles, gases and/or vapors, which may compromise the quality of the breathing air and be hazardous to health. A respirator system has at least one filter for filtering air and a breathing mask, to which the filtered air is fed. The breathing mask may be a hood, a helmet, a visor or even an oronasal mask or half mask.

To provide especially reliable protection from contaminated air, blower-assisted respirator systems additionally have a blower unit, which has a blower and a motor for driving the blower. The blower unit draws in the air filtered through the filter and generates discharged air, which is fed to the breathing mask. The blower unit is operated such that an overpressure prevails in the breathing mask, so that only filtered air can escape from the filter mask, but no contaminated air can enter the interior of the breathing mask. Respirator systems with a blower filter device assist the user by lowering the airway resistance, unlike conventional gas masks, and this make fatigue-free long-term use possible.

Blower-assisted respirator systems, which are also called "PAPR" (Powered Air-Purifying Respirator) systems, are known, for example, from DE 100 21 581 B4, EP 0 413 555 A1, and DE 689 09 707 T2.

It is decisive, for the breathing protection offered by a blow-assisted respirator system, to rule out reduced pressure in the breathing mask during the inhalation phase, which is achieved by feeding a defined, constant volume flow of filtered air into the breathing mask. It is thus ensured that the inhaled air is supplied exclusively through the feed of air from the blower filter device rather than from the contaminated surrounding area due to possible leaks of the breathing mask, because excess air is steadily flowing through the exhalation valve of the breathing mask into the surrounding area.

It is known that parameters of the respirator system itself and parameters of the surrounding area, in which the respirator system is operated, are taken into account in the mode of operation of the motor of the blower unit in order to make a constant volume flow of filtered air available to the user of the respirator system.

Methods for operating blower-assisted respirator systems are disclosed, for example, in DE 10 2010 031 754 B4, DE 10 2004 013 453 B4, US 2009/0 266 361 A1, WO 2011/019 778 A1, and DE 102 50 414 A1. For example, WO 2011/019 778 A1 thus shows a method for regulating a motor-operated blower-respirator system for supplying a uniform volume flow, where the density of the ambient air or an ambient temperature and an ambient pressure are taken into account for setting a manipulated electric variable of the motor on the basis of two calibration values.

SUMMARY OF THE INVENTION

An object of the present invention is to further improve the operation of a blower-assisted respirator system in order to make it possible to make available a constant volume flow to the breathing mask of the user.

In one aspect according to the present invention, the present invention pertains to a blower filter device for a respirator system with a filter unit for receiving a filter for filtering air, with a blower unit for drawing in the filtered air and for generating discharged air, wherein the blower unit has a blower and a motor for driving the blower, with a pressure sensor arranged in the discharged air generated by the blower unit for measuring the pressure of the discharged air at the outlet of the blower, with a mass flow sensor arranged in the discharged air (in the path of the discharged air) generated by the blower unit for measuring the mass flow of the discharged air, and with a control unit for determining the volume flow of the discharged air by means of the measured pressure and by means of the measured mass flow and for setting (setting operational aspects/controlling) the motor as a function of the volume flow determined.

In another aspect according to the present invention, the present invention pertains to a blower filter device for a respirator system with a filter unit for receiving a filter for filtering air, with a blower unit for drawing in the filtered air and for generating discharged air, wherein the blower unit has a blower and a motor for driving the blower, with a pressure sensor arranged in the discharged air generated by the blower unit for measuring the pressure of the discharged air at the outlet of the blower, with a parameter-determining unit for determining an operating parameter of the motor, and with a control unit for determining the volume flow of the discharged air by means of the measured pressure and by means of the operating parameter determined and for setting the motor as a function of the volume flow determined.

The basic idea of the present invention is that feeding of an incorrect (i.e., excessively large or excessively small) volume flow to the breathing mask can be avoided by arranging an absolute pressure sensor in the air outlet of the blower filter device, which measures the pressure of the filtered air being transported to the breathing mask, and by performing a correction of the volume flow setting, volume flow control or volume flow regulation, which is based on blower characteristics or on a mass flow measurement, by means of the information on the measured pressure. It is decisive in this connection that the pressure that prevails in the air stream fed to the breathing mask is used for the correction. The volume flow generated by the blower unit can be maintained in this manner according to the present invention at a constant value despite changing operating conditions of the respirator system.

Changes in the operating conditions arise during use, for example, due to the fact that the temperature of the air being delivered increases in the course of the operation due to the self-heating generated by the device and due to a longer operating time at locations with very warm outside temperatures. Furthermore, the state of the filters being used to filter the ambient air changes due to the duration of use. The loading of the filter with pollutants and particles and hence also the flow resistance of the filter increase continuously with increasing operating time. Prior-art blower filter devices use measuring means, which measure the mass flow, to set the blower and thus to maintain a constant volume flow. For example, differential pressure sensors at a measuring diaphragm or hot wire anemometers are used in this case. It is also common practice to implement a setting, performed as a control or as a regulation based on motor characteristics. However, all these methods share the drawback that the mass flow rather than the volume flow is maintained at a constant value. However, the volume flow can be inferred from the mass flow based on the density of the air.

In another aspect, the present invention pertains to a respirator system. The respirator system comprises a breathing mask, a blower filter device according to the present invention and a hose, which connects the blower filter device with the breathing mask. The blower unit of the blower filter device is designed to discharge the discharged air to the breathing mask by means of the hose.

In one embodiment, the filter unit of the blower filter device has a filter for filtering air. The filter unit may also be designed to receive a plurality of filters and different filters.

The inventors of the present invention propose to also include the dependence of the air density on at least one pressure (also temperature and/or air humidity in preferred embodiments) in the determination of the volume flow, as will be explained below:

The relationship between the volume flow and mass flow, on the one hand, and the density, on the other hand, is given by the following equations:

Gas density=mass/volume=$\rho$=$m/V$

Volume flow=$dV/dt$

Mass flow=$dm/dt$

The thermal state equation of an ideal gas is determined as follows:

$p = \rho \cdot Rs \cdot T$ óp=$p/(Rs \cdot T)$ in which Rs is the specific gas constant, p is the pressure at the outlet of the blower filter device, and T is the temperature. The density of the air consequently depends on the pressure, temperature and specific gas constant Rs.

It follows from this that:

$dV/dt = (dm/dt)/\rho$ $dV/dt = [(dm/dt)/p] \cdot Rs \cdot T$.

Consequently, the volume flow depends not only on the mass flow, as it is taken into account in conventional respirator systems, but also on the pressure, temperature, and special gas constant. This is taken into account in the blower filter device according to the present invention by having at least one pressure sensor arranged in the discharged air generated by the blower unit to measure the pressure of the discharged air. The mass flow is determined by a mass flow sensor and the volume flow is determined by means of the pressure determined in the air outlet at this site in order to thus set the blower regarding a constant volume flow. As an alternative, the blower can be set, controlled or regulated by a characteristic regulation to a constant mass flow. The characteristic regulation utilizes in this case, for example, the relationship between the motor current or motor output and the blower speed. It is known that a characteristic describes the sum of all working points with constant mass flow in a characteristic diagram that is defined by these variables. The determination of the pressure in the air outlet will then make it possible to correctly select the characteristic necessary for the constant volume flow.

If at least one operating parameter of the motor of the blower unit is determined for setting, controlling or regulating the volume flow, blower unit characteristics or a characteristic diagram can be used for this, as they are described, for example, in EP 0 518 538 A2 and are thus also included in the disclosure of the present invention. If the setting, control or regulation according to the present invention is carried out on the basis of characteristics or a characteristic diagram, the phrase "determination of an operating parameter of the motor" pertains to the determination of the operating parameter on the basis of the characteristics or of the characteristic diagram, and the operating parameter is to be defined in this case as a working point on a characteristic or in the characteristic diagram.

The present invention comprises especially the following two, especially preferred aspects concerning the maintenance of a constant volume flow:

i) Setting of the motor on the basis of the measured pressure and the measured mass flow: The operation of the motor is set, controlled or regulated in terms of its speed by means of a flow sensor. Hot wire sensors or differential pressure sensors may be used as flow sensors. Hot wire sensors or thermal flow sensors of a similar design detect a heat transport as an indicator of the quantity of air (mass) flowing past. The gas species (heat conductivity, heat capacity), temperature and density of the gas can be taken into account as influencing variables, and the influencing variables themselves may be temperature-dependent as well. If the area A through which flow takes place in the blower unit is known, the volume flow can be calculated. When using a differential pressure sensor ($\Delta P$) for flow measurement, the pressure difference is determined over a known flow resistance, for example, a diaphragm or a laminar flow element (LFE). Similarly to what was described above in respect to hot wire sensors, the flow can then be calculated with the use of more information, such as the gas species, viscosity, density, absolute pressure and temperature as well as the area A through which the flow takes place. A correction according to the present invention of the setting is then performed for both types of sensors on the basis of the pressure prevailing at the outlet.

ii) Setting of the motor on the basis of the measured pressure and the operating parameter determined: In a preferred embodiment of this aspect of the present invention, the speed of the motor is set, controlled or regulated by means of a characteristic diagram. A characteristic diagram represents a relationship between the motor speed n and the electric power consumption $I_{clcktr}$ or the electric power input of the blower $P_{clcktr}$ for the volume flow $V_{strom}$ discharged in the hose. A characteristic diagram is converted on the basis of the pressure sensor at the outlet if the pressure detected by the pressure sensor deviates from the pressure that is stored in the characteristic diagram as a "basic characteristic." Effects due to changes in the ambient air pressure may be essential for a pressure deviation detected by the pressure sensor. Changes in the air pressure may be of a meteorological nature (changes in weather) or be caused by changes in barometric altitude (at sea level, at altitudes >2,000 m in the Andes, mine <500 m in South Africa) during the use of such blower filter devices. Measurement of the pressure in the air outlet is markedly more accurate than the measurement of the ambient pressure itself, because the pressure built up due to the blower itself relative to the surrounding area is also detected in this case and it is thus made possible to maintain a constant volume flow especially accurately.

It is common to both aspects I) and ii) of maintaining a constant volume flow that the detection of a pressure, which contains both the increase in pressure due to the blower and the effect of changes in the ambient pressure, is made by the pressure sensor arranged at the outlet.

Consequently, a correcting resetting, follow-up or readjustment of the volume flow is performed according to the present invention by means of the absolute pressure measured at the outlet of the blower outlet on prior-art volume flow control means or volume flow regulating means, which are based on the use of a mass flow sensor or characteristics of the blower unit. The setting of the volume flow, volume flow control or volume flow regulation takes place in this case by the correction of the measured mass flow information or the mass flow information determined by the characteristics, including the pressure at the outlet of the blower outlet, to determine the volume flow corrected according to the present invention.

The absolute pressure at the outlet of the blower contains both the pressure that is made available as overpressure for the breathing mask by the blower and the pressure component that is affected and caused by the ambient pressure. Especially in case of use as a respirator system, when the blower delivers a volume flow, the user has put on the breathing mask and the blower filter device is connected with the breathing mask by means of the hose, the pressure value detected as absolute pressure at the outlet of the blower represents the pressure that is available as overpressure for the user in the breathing mask. The volume flow of the blower filter device can thus be set correctly both to the actual pressure conditions for the user during use and also in case of use at different altitudes due to the pressure measurement according to the present invention for correcting the volume flow. Due to the pressure measurement according to the present invention at the blower outlet, in addition to the effect of the ambient pressure, the correction of the volume flow also includes the pressure drops resulting from the volume flow based on the flow resistances of the filters, which vary depending on the particle load, and the flow resistances caused by the design embodiment of the blower filter device (blower, connection elements, internal flow channel). Due to the arrangement of the pressure sensor according to the present invention at the outlet of the blower, the absolute pressure sensor can directly measure the pressure in the air stream that already carries purified air. This reduces the susceptibility to error of the system, because the pressure sensor is not exposed as a result to potentially harmful dusts and gases and damage, contamination and the like can thus be prevented from occurring. In particular, the entry of harmful dusts to a pressure sensor, which is directly exposed to the unpurified ambient air, does, for example, entail as a drawback the fact that the measured signal may be absent in case of intense contamination or it may not contain usable current pressure information, which would possibly still be recognized as an error. Besides, an increasing contamination before a loss of the sensor signal may, however, lead to a slow change in the dynamic characteristics (response characteristics) of the sensor, because dusts and contaminants do increasingly adhere to the sensor in the course of ongoing operation. Such a slow change in the dynamic characteristics on a pressure sensor, which is directly exposed to the unpurified ambient air, is not recognizable during use (during the operation of such a filter device), and possibilities of recognition may be given at best at the time of cleaning of such a filter device, which leads to a greater maintenance effort, which is disadvantageous for the user, and to short intervals between tests. Further drawbacks of a pressure sensor that is directly exposed to the unpurified ambient air arise from the fact that such a pressure sensor is exposed during use to a broad range of ambient temperatures and ambient humidity levels. During the use of such a filter device, the filter device is exposed to a broad range of ambient temperatures, e.g., $-10°$ C. or colder on the outside grounds of an industrial plant, $+40°$ C. to $+60°$ C. in the shaft of a mine or in production plants of the metal-processing industry. This imposes strict requirements concerning the quality and accuracy of the pressure sensor. Arrangement of the pressure sensor at the outlet of the blower reduces the effect of the ambient temperature on the pressure sensor due to the thermal shielding action of the filter and the housing of the blower filter device in conjunction with the self-heating of the blower filter device by the waste heat of motor and electronic components arranged in the blower filter device and the range of the temperatures acting on the pressure sensor to about $+5°$ C. to $40°$ C. This reduces the requirements imposed on accuracy and the requirements imposed on quality and also has an advantageous effect concerning the reliability of operation; moreover, there is a favorable effect concerning the material costs for the blower filter device.

High ambient humidity in conjunction with dust in varying fields of use intensifies the above-described problems concerning susceptibility to error due to contaminants. Exposure of the pressure sensor to an environment with salt-containing humid air or containing salt spray, as it affects this pressure sensor as an ambient effect and thus can leave behind salt residues on such a pressure sensor, for example, in coastal areas, onboard ships, in submarines or even on drilling platforms, can be mentioned as another weak point of such a pressure sensor exposed to the unpurified ambient air. This may affect, on the one hand, the accuracy of measurement and the time response of this pressure sensor, and besides, the salt residues may lead to increased susceptibility to corrosion, which may lead to a reduction of the service life of this pressure sensor exposed to the unpurified ambient air.

These above-mentioned susceptibilities to error are advantageously reduced by the arrangement of the pressure sensor at the outlet of the blower according to the present invention after the filtration and the fact that this makes it possible to measure the pressure in already purified air by avoiding such systematic weak points to the outside.

In one embodiment, the blower unit has, furthermore, a temperature sensor arranged in the discharged air generated by the blower unit for measuring the temperature of the discharged air. The control unit is configured both to determine the volume flow of the discharged air by means of the measured pressure, measured temperature and measured mass flow and to determine the volume flow of the discharged air by means of the measured pressure, measured temperature and determined operating parameter.

The pressure-based correction of the volume flow according to the present invention can be further improved if the temperature T of the discharged air is also taken into account at the outlet of the blower in addition to the pressure, because the volume flow also depends on the temperature:

$$dV/dt=[(dm/dt)/p]\cdot Rs\cdot T.$$

The position of the temperature sensor in the air outlet at the outlet of the blower is also decisive for the temperature determination, because the air is heated by the flow through the filter and the chemical reactions associated therewith.

In one embodiment, the blower unit has, furthermore, an air humidity sensor arranged in the discharged air generated by the blower unit for measuring the humidity of the discharged air at the outlet of the blower. The control unit is configured both to determine the volume flow of the discharged air by means of the measured pressure, measured air humidity and measured mass flow and to determine the volume flow of the discharged air by means of the measured pressure, measured air humidity and operating parameters determined.

In another preferred variant, the control unit is configured, furthermore, on the one hand, to determine the volume flow of the discharged air by means of the measured pressure, by means of the measured temperature, by means of the measured air humidity, and by means of the measured mass flow, and, on the other hand, to determine the volume flow of the discharged air by means of the measured pressure, by means of the measured temperature, by means of the measured air humidity, and by means of the operating parameters determined.

The pressure-based correction of the volume flow according to the present invention can be further improved if the air humidity, which affects the special gas constant Rs, of the discharged air at the outlet of the blower is also taken into account in addition to the pressure, because the volume flow also depends on the air humidity (and hence on the special gas constant Rs):

$$dV/dt=[(dm/dt)/p]\cdot Rs\cdot T$$

The position of the air humidity sensor in the air outlet of the blower is also decisive for the determination of the air humidity, because the air humidity is changed by the flow through the filter and the chemical reactions accompanying it.

Both the temperature and air humidity at the blower outlet are measured and included in the pressure-based correction of the volume flow in one embodiment.

In one embodiment, the operating parameter represents the speed and/or electric current of the motor. The operating parameter preferably represents a working point on a characteristic (curve) of the blower unit. The determination of the mass flow by means of one or more operating parameters is preferably carried out on the basis of speed/mass flow characteristics of the blower unit. The speed/mass flow characteristics may be stored, for example, in the blower filter device according to the present invention as characteristics between the electric current and the speed of the blower.

The setting of the motor (setting, control or regulation of the motor) according to the present invention is carried out in another embodiment on the basis of characteristics such as those disclosed, for example, in EP 0 518 538 A2 or DE 10 2010 031 754 B4. These characteristic-based control and regulation methods are corrected according to the present invention with the measured pressure (also with the measured temperature and/or air humidity in some embodiments) in order to make it possible to set the volume, control the volume or regulate the volume more accurately.

In one embodiment, the control unit is configured to prompt the motor to increase or decrease the speed of the motor. This advantageously takes place by changing the electric current or output of the motor.

The present invention pertains, furthermore, to a method for operating a blower filter device with the steps of
    filtering air,
    drawing in the filtered air, and
    generating discharged air through a blower unit,
        wherein the blower unit has a blower and a motor for driving the blower,
    measuring a pressure of the discharged air at the outlet of the blower,
    measuring a mass flow of the discharged air at the outlet of the blower,
    determining a volume flow of the discharged air by means of the measured pressure and by means of the measured mass flow, and
    setting of the motor as a function of the volume flow determined.

In another aspect, the present invention pertains to a method for operating a blower filter device with the steps of:
    filtering air,
    drawing in the filtered air and
    generating discharged air through a blower unit,
        wherein the blower unit has a blower and a motor for driving the blower,
    measuring a pressure of the discharged air at the outlet of the blower,
    determining an operating parameter of the motor,
    determining a volume flow of the discharged air by means of the measured pressure and by means of the operating parameter determined, and
    setting the motor as a function of the volume flow determined.

In one embodiment, the method additionally has the following step/the following steps:
    measurement of a temperature and/or an air humidity of the discharged air at the outlet of the blower, and
    determination of a volume flow of the discharged air at the outlet of the blower by means of the measured pressure, by means of the measured mass flow, by means of the measured temperature and/or by means of the measured air humidity.

The method steps described describe preferred embodiments of the operation of a blower filter device, but the present invention is not limited to the described order of the method steps. The method steps described may consequently also be carried out in another order; in particular, the steps of measurement are limited to the order being described here.

The above-described embodiments may be combined with one another and with the above-described aspects in order to obtain advantages according to the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
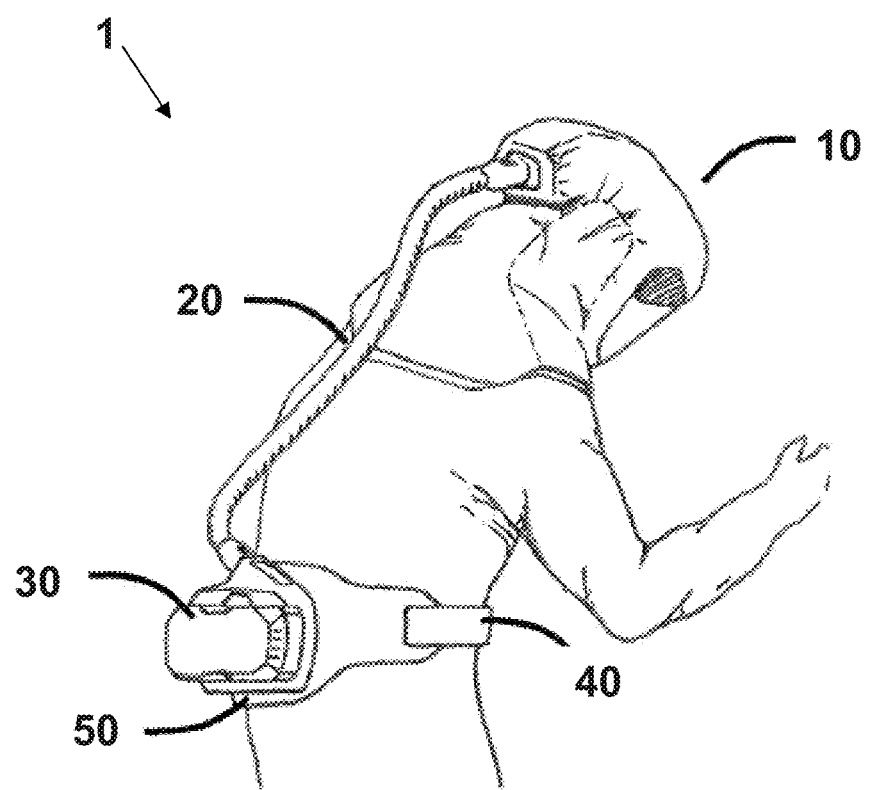
FIG. 1 is a perspective view of an embodiment of a blower-assisted respirator system according to the invention.

Referring to the drawings in particular, FIG. 1 shows a blower-assisted respirator system 1, which has a breathing mask 10, a hose 20, a filter 30, a carrying belt 40, and a blower filter device 50. The blower filter device 50 comprises a housing that is attached to the carrying belt 40, which is worn by the user around the hips. The breathing mask 10 is designed as a hood or mask in the exemplary embodiment shown in FIG. 1. The breathing mask 10 is connected with the blower filter device 50 via the hose 20. The hose 20 may be designed as a pleated hose to make possible improved movement for the user.

The polluted or contaminated air is drawn in by means of the blower filter device 50 through a filter 31, which is fastened in a filter unit 30, as a result of which it is freed of harmful substances and is subsequently fed to the breathing mask 10 and to the user through the hose 20.

As was explained above, the correction of the volume flow setting, volume flow control or volume flow regulation according to the present invention is based on the following equation:

$$dV/dt = [(dm/dt)/p] \cdot Rs \cdot T$$

in which $p = \rho \cdot Rs \cdot T \Leftrightarrow \rho = p/(Rs \cdot T)$.

The density of the air consequently depends on the pressure, temperature and special gas constant Rs. Rs depends, in turn, on the pressure, relative humidity and vapor pressure. The vapor pressure depends on the temperature. These relationships are summarized below:

Input: absolute temperature T $$x = T/T_0$$

$$pd = a \cdot e^{\frac{b \cdot (x-1)}{x+c}}$$ Vapor pressure pd

Input: absolute pressure p, relative humidity $r_h$ $$R_S = \frac{R_l}{\left[1 - r_h \cdot \frac{p}{pd} \cdot \left[\frac{1-R_l}{R_d}\right]\right]}$$ Special gas constant Input: absolute pressure p, absolute temperature T $$\rho = \frac{p}{R_S \cdot T}$$ Density of air If usual ambient conditions are assumed for blower filter devices, the effect of these conditions on density becomes apparent:
p=1,100 . . . 700 hPa (−700 . . . 3,000 m above sea level)
T=263 . . . 333 K (−10 . . . 60° C.)
rh<100%.

Figure 2:
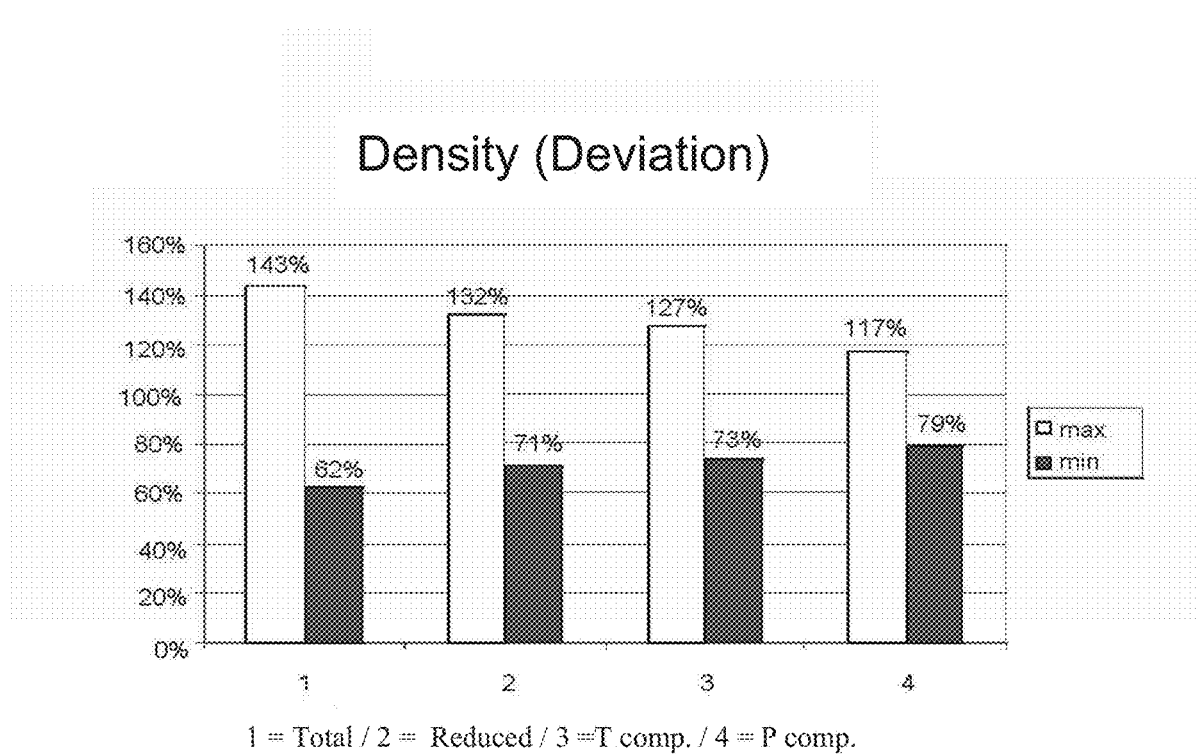
FIG. 2 is a diagram showing the deviation of the density in case of compensation by temperature and pressure.

FIG. 2 shows the deviation of the density from standard conditions (1,013 hPa, 20° C., dry air) in case of compensation by pressure and temperature, on which the correction of the volume flow setting, volume flow control or volume flow regulation according to the present invention is based. The actual-to-desired deviation of the density in % is plotted on the y axis. The x axis is divided into four sections with two measurement series of different ambient conditions each, which will be explained below:

The deviation of the density and hence the error of the volume flow is shown in section 1 when no correction according to the present invention is performed and broad spectra of ambient conditions are assumed. The actual-to-desired deviations are markedly greater than the deviations of sections 2 through 4 described below.

The assumptions concerning the ambient conditions are limited in section 2 such that the working conditions are still acceptable, e.g., for example, 0° C.<T<40° C. The deviations are already smaller than in FIG. 1.

The corrections of the density according to the present invention are shown in sections 3 and 4 when the air temperature (section 3) and pressure (section 4) are determined and also included in the determination of the density. A compensation by the air temperature reduces the error better than this is achieved by the assumptions made in section 2. The greatest improvement is achieved by the compensation by means of the pressure. The air humidity has a markedly weaker effect (not shown in FIG. 2).

Figure 3:
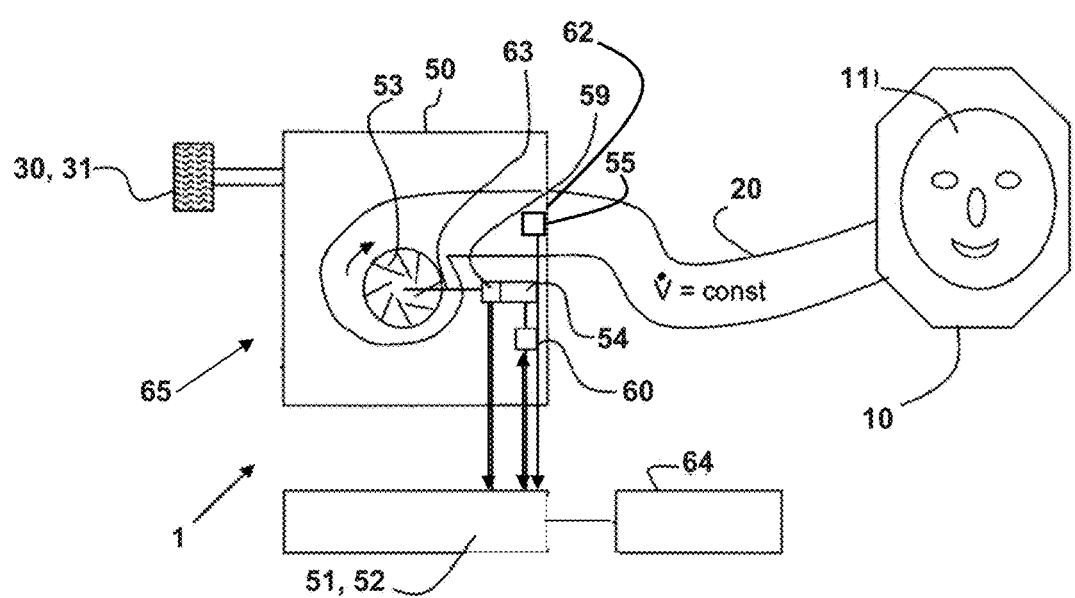
FIG. 3 is a schematic view showing an embodiment of a blower filter device according to the present invention of a respirator system.

FIG. 3 shows an embodiment of a blower filter device 50 of a respirator system 1, in which the mass flow is determined by means of operating parameters of the motor. FIG. 3 consequently illustrates a characteristic-based setting of the blower filter device 50 according to the present invention.

FIG. 3 shows a blower filter device 50, which is connected by means of a hose 20 with a breathing mask 10 of a user 11. If the blower filter device 50 is operated, it draws in contaminated air through the filter 30, which is arranged at the filter unit 31, and delivers the filtered air as a discharged air at the outlet 62 into the hose 20 and thus to the breathing mask 10.

The blower filter device 50 has a blower unit 65, which contains a blower 53 and a motor 54. The motor 54, which is supplied with power from the power source 64, drives the blower 53 by means of the drive shaft 63. The blower unit 65 has, furthermore, a tachometer 59 for measuring the speed of the drive shaft 63 or of the blower 53, and an ammeter 60 for measuring the electric current, with which the motor 54 is operated. This provides a mass flow determination means for determining a mass flow of the discharged air. The mass flow can be inferred (determined—essentially determined) from the speed and electric current by means of characteristics of the blower unit 65, as this is disclosed, for example, in EP 0 518 538 A2. EP 0 518 538 A2 is incorporated herein by reference. The speed of the drive shaft 63 or of the blower 53 connected with the drive shaft 63 and the electric current represent operating parameters of the motor 54, which make it possible to determine the mass flow.

The blower filter device 50 has, furthermore, a pressure sensor 55, which is arranged in the discharged air at the outlet of the blower 53 and measures the pressure of the discharged air. Both the information on the speed and electric current as well as the information on the pressure of the discharged air are entered into the volume flow-determining unit 51. The volume flow-determining unit 51 determines the mass flow by means of the speed of the motor and of the electric current by means of characteristics typical of the blower unit and then determines the volume flow by means of the mass flow and of the pressure of the discharged air at the outlet of the blower 53. If the actual volume flow determined is lower than a desired volume flow, the control unit 52 prompts the motor 54 to increase the speed by the electric current being increased. If the actual volume flow determined is greater than a desired volume flow, the control unit 52 prompts the motor 54 to reduce the speed by reducing the electric current.

Figure 4:
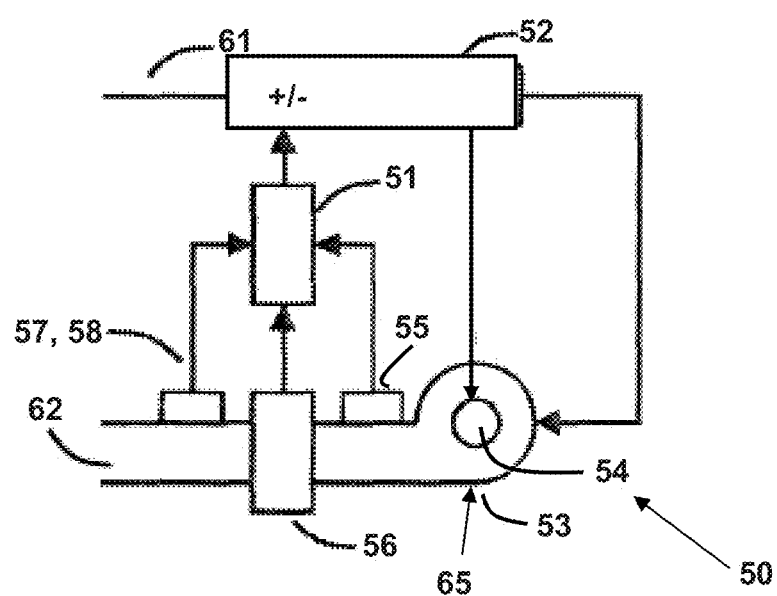
FIG. 4 is a schematic view showing another embodiment of a blower filter device according to the present invention of a respirator system.

FIG. 4 shows an embodiment of a blower filter device 50, in which the mass flow is determined by means of a mass flow sensor 56. This provides a mass flow determination means for determining a mass flow of the discharged air. FIG. 4 consequently shows a mass flow-based (ΔP) regulation with the use of the measured pressure at the pressure sensor 55 for the direct pressure value correction ("simple" density correction).

Insofar as the features of the embodiment according to FIG. 4 agree with those of the embodiment according to FIG. 3, reference is made to the above-described features. The embodiment according to FIG. 4 differs from the embodiment according to FIG. 3 in the alternative determination of the mass flow.

The blower filter device 50 according to the embodiment shown in FIG. 4 has an inlet 61 and an outlet 62. The inlet 61 is connected with the filter 30 or filter unit 30 and the outlet 62 is connected with the hose 20. The blower filter device 50 has a blower unit 65 with a blower 53 and a motor 54 for driving the blower 53. The blower unit 65 delivers a volume flow, which is sent to the breathing mask 10 via the outlet 62.

A pressure sensor 55, a mass flow sensor 56, a temperature sensor 57 and an air humidity sensor 58 are arranged in the outlet 62. The temperature sensor 57 and the air humidity sensor 58 are shown as one unit for simplicity's sake in FIG. 4; however, they may, of course, also be designed as separate units.

The mass flow sensor 56 sends a measured value of the mass flow of the discharged air, which is converted in the volume flow-determination unit 51 into a volume flow taking into account the pressure, temperature and air humidity. The volume flow-determining unit 51 outputs the result of the volume flow calculation on the control unit 52, which performs a corresponding setting of the blower unit 65 (comprising setting the motor) by the speed being increased or decreased.

It should be additionally mentioned that the embodiments according to FIGS. 3 and 4 are only examples. For example, the embodiment according to FIG. 3 may thus also have a temperature sensor 57 and/or an air humidity sensor 58.

Figure 5:
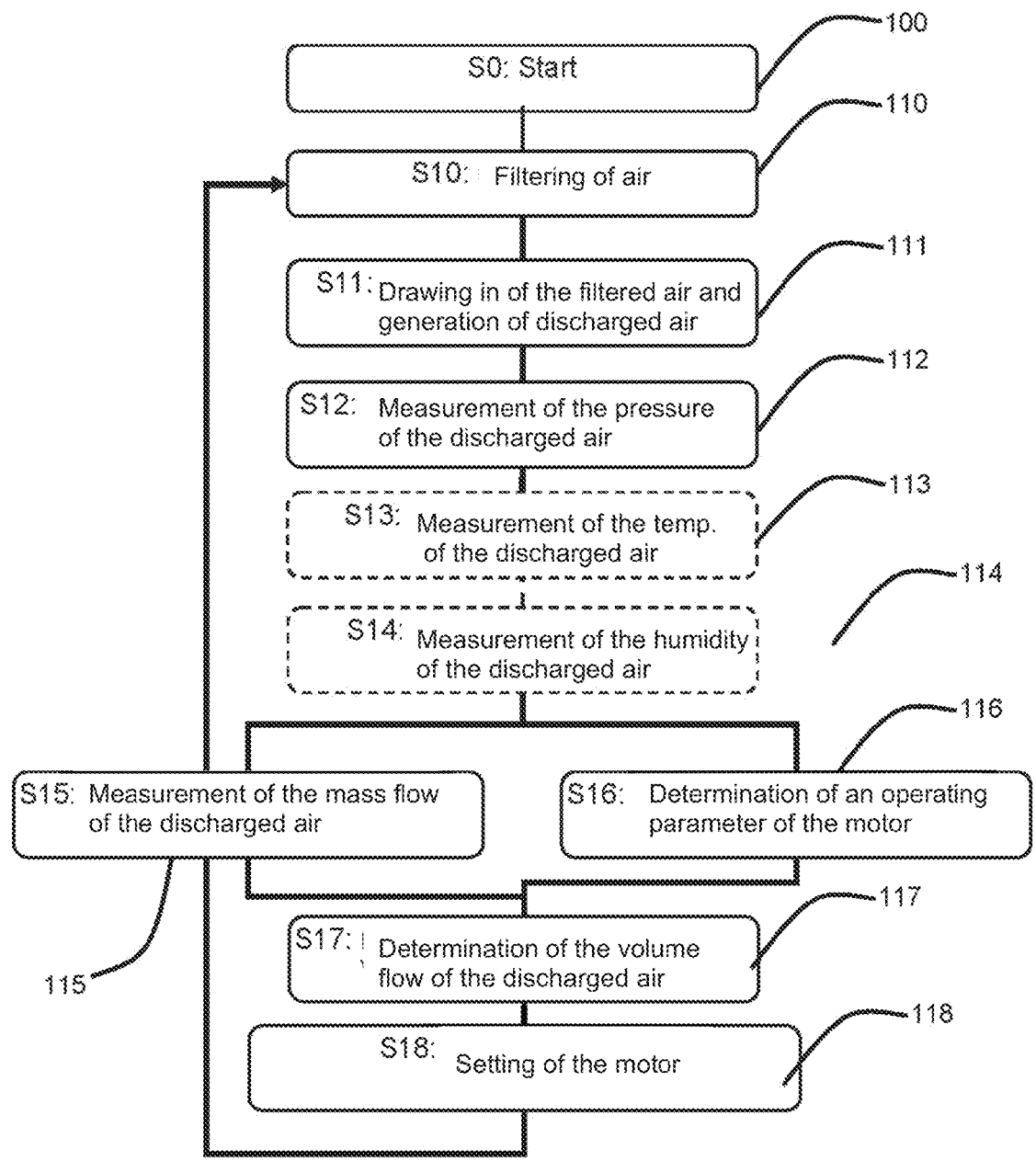
FIG. 5 is a flow diagram showing an embodiment of a method according to the present invention for operating a blower filter device.

FIG. 5 shows an embodiment of a method according to the present invention for setting the volume flow in a blower filter device 50 of a respirator system 1. After start-up in step "Start 100" S0 100 of the blower filter device 50 (for example, of the blower filter device 50 that is shown in FIGS. 1, 3 and 4), the method carries out the following sequence of steps in a preferably continuously repeating sequence:

Steps S10 110 through S12 112 and S15 115, S17 117 and S18 118 (as well as optionally steps S13 113 and/or S14 114), steps S10 110 through S12 112 and S16 116, S17 117 and S18 118 (as well as optional steps S13 113 and/or S14 114), setting of the blower filter device 50 (for example, of the blower filter device 50 that is shown in FIGS. 1, 3 and 4).

Air is drawn in through the filter 30 in the steps S10 "Filtering of air" 110 and S1 "Drawing in of the filtered air and generation of discharged air" 111 by the blower 53 being driven by the motor 54, and discharged air is released to the hose 20, which in turn feeds this filtered discharged air to the breathing mask 10 of the user 11.

The pressure of the discharged air is measured in step S12 "Measurement of the pressure of the discharged air" 112.

The temperature and/or humidity of the discharged air are also measured additionally in the optional steps S13 "Measurement of the temperature of the discharged air" 113 and S14 "Measurement of the humidity of the discharged air" 114.

The mass flow of the discharged air is determined in the steps S15 "Measurement of the mass flow of the discharged air" 115 and S16 "Determination of an operating parameter of the motor" 116, which are to be carried out alternatively. This happens in step S15 by the direct measurement of the mass flow and in step S16 by the determination of an operating parameter of the motor and of the characteristics connected with this, by means of which the mass flow can be inferred. Only one of the steps S15 and S16 is carried out.

The volume flow of the discharged air is calculated in step S17 "Determination of the volume flow of the discharged air" 117 by means of the measured pressure and (a) of the measured mass flow or (b) of the operating parameter determined.

If the temperature was also measured in step S13, the temperature is also included in the calculation of the volume flow.

If the air humidity was also measured in step S14, the air humidity is also included in the calculation of the volume flow.

The motor 54 is set as a function of the volume flow determined in step S18 "Setting of the motor" 118. If the volume flow calculation revealed, for example, that the actual volume flow is lower than the desired volume flow, where the desired volume flow determines the overpressure for the breathing protection of the user in the breathing mask, the control unit 52 prompts the motor 54 of the blower 53 to deliver a larger volume. This happens, for example, by increasing the speed, by increasing the electric current or output for the motor 54. A correspondingly increased volume flow is then drawn in, filtered and released as discharged air to the breathing mask 10 of the user 11 in steps S10 and S11 until the blower unit 65 reaches the setting in which the actual volume flow corresponds to the desired volume flow.

Correspondingly, the speed, electric current and output of the blower unit are reduced and the blower unit is adjusted until the actual volume flow corresponds to the desired volume flow if the volume flow calculation reveals that the actual volume flow is greater than the desired volume flow.

The method then starts again with the measurement of the pressure of the discharged air in step S12, as indicated in FIG. 5 by the arrow from S18 to S12.

While specific embodiments of the invention have been shown and described in detail to illustrate the application of the principles of the invention, it will be understood that the invention may be embodied otherwise without departing from such principles.

APPENDIX

1 Respirator system
10 Breathing mask
11 User
20 Hose
30 Filter
31 Filter unit
40 Carrying belt
50 Blower filter device
51 Volume flow-determining unit
52 Control unit
53 Blower
54 Motor
55 Pressure sensor
56 Mass flow sensor
57 Temperature sensor
58 Air humidity sensor
59 Tachometer
60 Ammeter
61 Inlet
62 Outlet
63 Drive shaft
64 Power source
65 Blower unit
100 Start
110 Filtering of air
111 Drawing in of the filtered air and generation of discharged air
112 Measurement of the pressure of the discharged air
113 Measurement of the temperature of the discharged air
114 Measurement of the humidity of the discharged air
115 Measurement of the mass flow of the discharged air
116 Determination of an operating parameter of the motor
117 Determination of the volume flow of the discharged air
118 Setting of the motor as a function of the volume flow determined

What is claimed is:

1. A blower filter device for a respirator system, the blower filter device comprising:
   a filter unit for receiving a filter for filtering air;
   a blower unit for drawing in the filtered air and for generating discharged air, the blower unit comprising a blower and a motor for driving the blower and having an outlet through which the discharged air flows;
   a pressure sensor arranged in the discharged air generated by the blower unit for measuring the pressure of the discharged air;
   a mass flow determination means for determining a mass flow of the discharged air; and
   a control unit for determining the volume flow of the discharged air based on the measured pressure and based on the determined mass flow and for setting the motor as a function of the volume flow determined.

2. A blower filter device in accordance with claim 1, wherein the mass flow determination means comprises a mass flow sensor arranged in the discharged air generated by, and downstream of, the blower unit for measuring the mass flow of the discharged air.

3. A blower filter device in accordance with claim 2, further comprises a temperature sensor arranged in the discharged air generated by the blower unit for measuring temperature of the discharged air wherein the control unit determines the volume flow of the discharged air based on the measured pressure, the measured temperature and the measured mass flow.

4. A blower filter device in accordance with claim 2, further comprising an air humidity sensor arranged in the discharged air generated by the blower unit for measuring humidity of the discharged air, wherein the control unit determines the volume flow of the discharged air based on the measured pressure, the measured air humidity and the measured mass flow.

5. A blower filter device in accordance with claim 2, further comprising:
   a temperature sensor arranged in the discharged air generated by the blower unit for measuring temperature of the discharged air; and
   an air humidity sensor arranged in the discharged air generated by the blower unit for measuring humidity of the discharged air, wherein the control unit determines the volume flow of the discharged air based on the measured pressure, based on the measured temperature, based on the measured air humidity and based on the measured mass flow.

6. A blower filter device in accordance with claim 1, wherein the mass flow determination means comprises a motor parameter-determining unit for determining an operating parameter of the motor, which operating parameter is a function of the mass flow of the discharged air.

7. A blower filter device in accordance with claim 6, further comprises a temperature sensor arranged in the discharged air generated by the blower unit for measuring temperature of the discharged air wherein the control unit determines the volume flow of the discharged air based on the measured pressure, the measured temperature and the operating parameter determined.

8. A blower filter device in accordance with claim 6, further comprising an air humidity sensor arranged in the discharged air generated by the blower unit for measuring humidity of the discharged air, wherein the control unit determines the volume flow of the discharged air based on the measured pressure, the measured air humidity and the operating parameter determined.

9. A blower filter device in accordance with claim 6, further comprising:
   a temperature sensor arranged in the discharged air generated by the blower unit for measuring temperature of the discharged air; and
   an air humidity sensor arranged in the discharged air generated by the blower unit for measuring humidity of the discharged air, wherein the control unit determines the volume flow of the discharged air based on the measured pressure, based on the measured temperature, based on the measured air humidity and based on the operating parameter determined.

10. A blower filter device in accordance with claim 6, wherein the operating parameter represents at least one of the speed and the electric current of the motor.

11. A blower filter device in accordance with claim 1, wherein the control unit sets the motor by increasing or decreasing the speed of the motor.

12. A blower filter device in accordance with claim 1, wherein:

the blower unit is provided in a blower filter device housing and the pressure sensor measures the pressure of the discharged air within the blower filter device housing; and the blower filter device housing is connected as a part of a powered air-purifying respirator system.

13. A respirator system comprising:
a breathing mask;
a hose; and
a blower filter device connected to the breathing mask via the hose, the blower filter device comprising:
   a filter unit for receiving a filter for filtering air;
   a blower unit for drawing in the filtered air and for generating discharged air, the blower unit comprising a blower and a motor for driving the blower, the blower unit releasing the discharged air to the breathing mask via the hose;
   a pressure sensor arranged in the discharged air generated by the blower unit for measuring the pressure of the discharged air;
   a mass flow determination means for determining a mass flow of the discharged air; and
   a control unit for determining the volume flow of the discharged air based on the measured pressure and based on the determined mass flow and for setting the motor as a function of the volume flow determined.

14. A respirator system in accordance with claim 13, wherein the filter unit of the blower filter device has a filter for filtering air.

15. A respirator system in accordance with claim 13, wherein the mass flow determination means comprises a mass flow sensor arranged in the discharged air generated by, and downstream of, the blower unit for measuring the mass flow of the discharged air.

16. A respirator system in accordance with claim 13, wherein the mass flow determination means comprises a motor parameter-determining unit for determining an operating parameter of the motor which operating parameter provides an indication of the mass flow of the discharged air.

17. A method for operating a blower filter device, the method comprising the steps of:
filtering air;
drawing in the filtered air and generating discharged air through a blower unit, wherein the blower unit has a blower and a motor for driving the blower;
measuring a pressure of the discharged air;
determining a value corresponding to the mass flow by determining an operating parameter of the motor or by measuring the mass flow of the discharged air;
determining a volume flow of the discharged air based on the measured pressure and based on the determined value corresponding to the mass flow; and
setting the motor as a function of the volume flow determined.

18. A method in accordance with claim 17, wherein the determined value corresponding to the mass flow is provided by one of a mass flow sensor arranged in the discharged air generated by the blower unit for measuring the mass flow of the discharged air and a motor parameter-determining unit for determining an operating parameter of the motor which operating parameter provides an indication of the mass flow of the discharged air.

19. A method in accordance with claim 18, further comprising the steps of:
measuring at least one of a temperature and a humidity of the discharged air;
determining volume flow of the discharged air based on the measured pressure, based on the measured mass flow, and based on at least one of the measured temperature and the measured air humidity.

20. A method in accordance with claim 18 further comprising the steps of:
measuring at least one of a temperature and a humidity of the discharged air;
determining volume flow of the discharged air based on the measured pressure, based on the operating parameter that represents at least one of a speed and an electric current of the motor, and based on at least one of the measured temperature and the measured air humidity.

* * * * *